(12) United States Patent
Smith (10) Patent No.: US 7,808,120 B2
(45) Date of Patent: Oct. 5, 2010

(54) METHOD AND APPARATUS FOR ENERGY GENERATION FROM WAVE MOTION

(75) Inventor: George Smith, Cults (GB)

(73) Assignee: Green Ocean Energy Limited, Aberdeen (GB)

( * ) Notice: Subject to any disclaimer, the term of this patent is extended or adjusted under 35 U.S.C. 154(b) by 404 days.

(21) Appl. No.: 11/795,661

(22) PCT Filed: Jan. 26, 2006

(86) PCT No.: PCT/GB2006/000261
§ 371 (c)(1),
(2), (4) Date: Aug. 24, 2007

(87) PCT Pub. No.: WO2006/079812
PCT Pub. Date: Aug. 3, 2006

(65) Prior Publication Data
US 2008/0122225 A1    May 29, 2008

(30) Foreign Application Priority Data
Jan. 26, 2005    (GB) .................................. 0501553.2

(51) Int. Cl.
*F03B 13/12* (2006.01)
(52) U.S. Cl. ............................. 290/42; 290/53; 60/506
(58) Field of Classification Search .................. 290/42, 290/43, 53, 54, 44; 60/501, 506
See application file for complete search history.

(56) References Cited

U.S. PATENT DOCUMENTS

| | | | |
|---|---|---|---|
| 1,018,678 A | | 2/1912 | Nelson |
| 3,965,365 A | * | 6/1976 | Parr .............................. 290/53 |
| 4,013,382 A | * | 3/1977 | Diggs .......................... 417/332 |
| 4,092,828 A | * | 6/1978 | Garza .......................... 60/506 |
| 4,105,368 A | | 8/1978 | Waters et al. |
| 4,281,257 A | * | 7/1981 | Testa et al. .................... 290/42 |
| 4,319,454 A | * | 3/1982 | Lucia ........................... 60/506 |
| 4,389,843 A | * | 6/1983 | Lamberti ...................... 60/507 |
| 4,408,455 A | * | 10/1983 | Montgomery ................ 60/505 |
| 4,480,966 A | * | 11/1984 | Smith .......................... 417/332 |
| 4,552,514 A | * | 11/1985 | Hagen .......................... 417/332 |
| 4,560,884 A | * | 12/1985 | Whittecar ..................... 290/42 |

(Continued)

FOREIGN PATENT DOCUMENTS

GB    1 587 593    4/1981

(Continued)

*Primary Examiner*—Nicholas Ponomarenko
(74) *Attorney, Agent, or Firm*—Drinker Biddle & Reath LLP (57) ABSTRACT

A method and apparatus for generating electric energy from the motion of the waves. The apparatus comprises at least one member which is moved by the motion of the waves. The apparatus also comprises an energy transfer mechanism coupled to the or each member. The energy transfer mechanism converts the kinetic energy from movement of the or each member to potential energy by pressurization of a fluid. The apparatus further comprises a first chamber, arranged to store the pressurized fluid and a conversion means for converting the potential energy stored in the pressurized fluid into electric energy. The apparatus can be arranged such that any substantially vertical displacement of the or each member causes actuation of the or each corresponding energy transfer mechanism.

29 Claims, 5 Drawing Sheets

U.S. PATENT DOCUMENTS

| | | | |
|---|---|---|---|
| 4,580,400 A * | 4/1986 | Watabe et al. | 60/398 |
| 4,781,023 A * | 11/1988 | Gordon | 60/506 |
| 4,792,290 A | 12/1988 | Berg et al. | |
| 5,084,630 A * | 1/1992 | Azimi | 290/53 |
| 5,708,305 A * | 1/1998 | Wolfe | 290/53 |
| 5,710,464 A * | 1/1998 | Kao et al. | 290/53 |
| 7,579,704 B2 * | 8/2009 | Steenstrup et al. | 290/53 |

FOREIGN PATENT DOCUMENTS

| | | |
|---|---|---|
| WO | WO 98/50696 | 11/1998 |
| WO | WO 01/92644 | 12/2001 |

* cited by examiner

METHOD AND APPARATUS FOR ENERGY GENERATION FROM WAVE MOTION

RELATED APPLICATION

This Application is the U.S. National Phase Application of PCT International Application No. PCT/GB2006/000261 filed Jan. 26, 2006.

FIELD OF THE INVENTION

The present invention relates to a method and apparatus for generation of energy from wave motion. In particular, the invention concerns conversion of wave energy into a smooth constant supply of electrical energy while maintaining a high level of efficiency throughout the conversion.

DESCRIPTION OF RELATED ART

There is an urgent need to develop systems for generating renewable energy to replace our current dependency on fossil fuels. In addition, it is necessary to minimise production of greenhouse gases which result from use of conventional non-renewable energy sources and can cause climate change which has negative irreversible effects on the world. Suitable sources for renewable energy include solar power, wind power and hydropower.

Harnessing wave energy has been previously considered, but in practise it has proved problematic to create an efficient system which provides a constant reliable source of power.

BRIEF SUMMARY OF THE INVENTION

The present invention aims to provide improved apparatus for energy generation from wave power.

According to a first aspect of the present invention there is provided apparatus for generating electric energy from the motion of the waves, comprising:
- at least one member moved by motion of the waves;
- an energy transfer mechanism coupled to the or each member wherein the energy transfer mechanism converts the kinetic energy from movement of the or each member to potential energy by pressurization of a fluid;
- a chamber arranged to store the pressurised fluid; and
- a conversion means for converting potential energy stored in the pressurised fluid into electric energy.

According to a second aspect of the present invention there is provided a method for energy generation from wave power comprising the steps of:—
- providing at least one member arranged to move in response to motion of the waves;
- converting kinetic energy of the at least one member into potential energy by pressurization of a fluid;
- storing the pressurised fluid in a chamber; and
- converting the potential energy of the pressurised fluid into electric energy.

The apparatus and method translates kinetic energy from wave motion to the at least one member moved by motion of the waves. Movement of the at least one member is used to pressurise a fluid thereby converting the kinetic energy into potential energy. The potential energy can be stored in the chamber before being released on demand. When released from the chamber, fluid at high pressure possesses kinetic energy, which is used to create electric energy using conversion means. Thus the apparatus and method of the present invention enables wave energy to be harnessed, stored and converted into electricity.

The chamber can be provided within a body. In use, the body can float in the water and can be shaped such that it is substantially stable relative to movement of the waves and the at least one member can be movable relative to the body.

In use, the longitudinal axis of the body can be arranged in a direction perpendicular to the seabed. The body can have a height greater than its lateral extent. The body can be weighted with ballast provided at or towards a lower end of the body such that a substantial proportion of the body is submerged in use, and an upper end of the body is arranged to protrude from the surface of the water. A mass can be provided at or towards a lower end of the body in use, such that the centre of gravity of the body is closer to the lower end than an upper end of the body.

The chamber and the conversion means can be housed within the body. The body can be anchored to the seabed. Preferably, the apparatus is arranged such that any substantially vertical displacement of the or each member causes actuation of the corresponding energy transfer mechanism.

A plurality of members can be provided. These members are moved by motion of the waves and can be any shape or size, wherein each member provides a wave sampling point and thus a plurality of wave sampling points are provided. Two substantially opposing sides of the body can each be provided with two members coupled thereto.

The at least one member can include a float or a body which is arranged to at least partially float.

The or each energy transfer mechanism can be located between the or each member and the body. The or each member can be coupled to an end of an arm and another end of the arm can be pivotally coupled to the body.

The energy transfer mechanism can comprise a fluid compressor coupled to the at least one member such that movement of the at least one member causes compression of fluid in the fluid compressor.

One end of the fluid compressor can be coupled to the arm and another end of the fluid compressor can be coupled to the body at a point vertically spaced from the pivotal coupling of the body and the arm.

The fluid compressor preferably comprises a rod and a piston moveable within a cylinder for containing the fluid to be pressurised. Alternatively the fluid compressor can comprise a rack and pinion mechanism and rotary compressor.

The apparatus can further comprise a directional means arranged to correctly orient the apparatus in use, relative to the wavefront. The directional means can comprise an anchor-arm coupled to the body and extending outwardly therefrom wherein the anchor-arm is arranged to be submerged in use. The directional means can further comprise a motor coupled to the body and the anchor-arm, which motor is operable to selectively move the anchor-arm and orient the body relative to the wavefront.

Preferably, the chamber comprises a container having an expandable bladder contained therein. Preferably, the container is filled with gas to react against the expandable bladder. Preferably, the bladder is in fluid communication with the energy transfer mechanism and is arranged to contain the pressurised fluid therefrom. Thus, the container and bladder acts as an accumulator, smoothing out the fluctuating input of pressurised fluid fed to the chamber by the or each energy transfer mechanism. Preferably, the bladder is made from rubber and the container is made from steel with an inert gas, such as nitrogen surrounding the bladder and used to maintain a constant pressure within the bladder. Preferably, several such containers and bladders are provided within the apparatus.

Preferably, the conversion means comprise a hydraulic motor coupled to one or more electricity generators. Preferably, the or each bladder is also in fluid communication with the hydraulic motor for supplying pressurised hydraulic fluid thereto.

Alternatively, the chamber can be a first chamber and the apparatus can also comprise a second chamber in fluid communication with the first chamber. Valve means can be provided between the first and second chambers to control the pressure in the second chamber by selectively allowing pressurised fluid from the first chamber into the second chamber and substantially preventing reverse flow of fluid. The first chamber contains pressurised fluid which will typically fluctuate according to energy input/output and provides an effective method of short-term energy storage. Preferably, the pressure of the first chamber is maintained at a higher level than that of the second chamber. The valve means can maintain a constant pressure in the second chamber allowing a substantially constant flow of pressurised fluid to be released to drive the conversion means.

According to the preferred embodiment, the conversion means for converting pressurised fluid into electric energy can be one or more turbines driven by pressurised fluid. The pressurised fluid preferably causes the turbines to rotate to power a generator.

The fluid compressor can be arranged to compress air. According to this embodiment, the first chamber may also be provided with a bilge and a pumping means to remove moisture contained in the air thereby allowing relatively dry air into the second chamber and the resulting water can be removed by the pumping means.

In the absence of the second chamber or the container and bladder arrangement there is likely to be a cyclical input into the generator corresponding to the oscillation of the waves. However, in order to achieve a constant supply of generated electricity it is desirable to ensure that the source of pressurised fluid entering the conversion means does not fluctuate. This can be achieved by the container and bladder arrangement or the combination of two chambers allowing a constant, more reliable source of pressurised fluid to enter the conversion means.

The apparatus preferably comprises a control system, which may include sensors that are able to monitor wave amplitude and frequency. Above a certain pre-determined wave height deemed to be beyond the safe operating limits of the system, the control system can be programmed to enter a storm survival mode. The storm survival mode can prevent the apparatus from excessive damage in the event of a storm.

The body can be provided with an outer frame and the one or more members can be arranged to be attached to the frame in the storm survival mode. In the storm survival mode the control system can lock the energy transfer mechanism in a pre-determined position and the at least one member can be retracted to avoid damage thereto. In the case where the member is a float, or a body arranged to at least partially float, the control system can effect flooding of the float/body with water to cause it to sink to a lower limit.

The apparatus is preferably designed to withstand water breaking thereover to avoid damage thereto in rough conditions.

The control system can also be programmed to detect a minimum predetermined wave height, which may be experienced in calm conditions when the energy input is insufficient to run a single generator. The control system can close the conversion means to seal the chamber(s) to contain pressurised fluid therein, thereby preventing energy wastage.

Two or more hydraulic motors and generators can be provided. It is beneficial to employ two or more generators since during light wave conditions one generator may be used and additional generators may be introduced in conditions with greater wave amplitude and frequency. This arrangement enables power generation throughout a range of wave conditions. Additionally, multiple generators increase the reliability and reduce the possibility of complete shutdown; in the event of a single failure there remains at least one other generator to continue energy generation. This is particularly important when the apparatus is used in harsh conditions in remote, locations which may be difficult to access by repair personnel.

The control system can allow the generators to be cycled to ensure each generator has substantially even running hours.

The present invention enables a pulsed energy input created by motion of the waves to be converted into a constant stable supply for a generator while maintaining a high level of efficiency. This allows for successful energy generation from a variety of input wave conditions. The simple design ensures low build costs and gives high reliability. The control system enables protection of the apparatus in extremely rough conditions and prevents energy wastage when a constant source of electric energy cannot be created under calm conditions.

The method can include housing the chamber in a body and shaping the body such that it is substantially stable in response to the motion of the waves. The method can include anchoring the body to the seabed. The at least one member can move relative to the stable body.

The method can include providing a weight at or towards a lower end of the body in use, and thereby lowering the centre of gravity such that it is closer to the lower end than an upper end of the body.

The method can include pivotally coupling one end of an arm to the body and attaching the or each member to another end of the arm. The method can include pivotally coupling one end of an energy transfer mechanism to the arm and another end of the energy transfer mechanism to the body, vertically spaced from the coupling with the body and the arm.

The method can include orienting the body correctly relative to each wavefront.

The present invention provides a good electric energy return for the footprint area occupied by the apparatus.

BRIEF DESCRIPTION OF THE SEVERAL VIEWS OF THE DRAWINGS

Embodiments of the invention will now be described, by way of example only, with reference to and as shown in the following figures in which:—

DETAILED DESCRIPTION OF THE INVENTION

Figure 1:
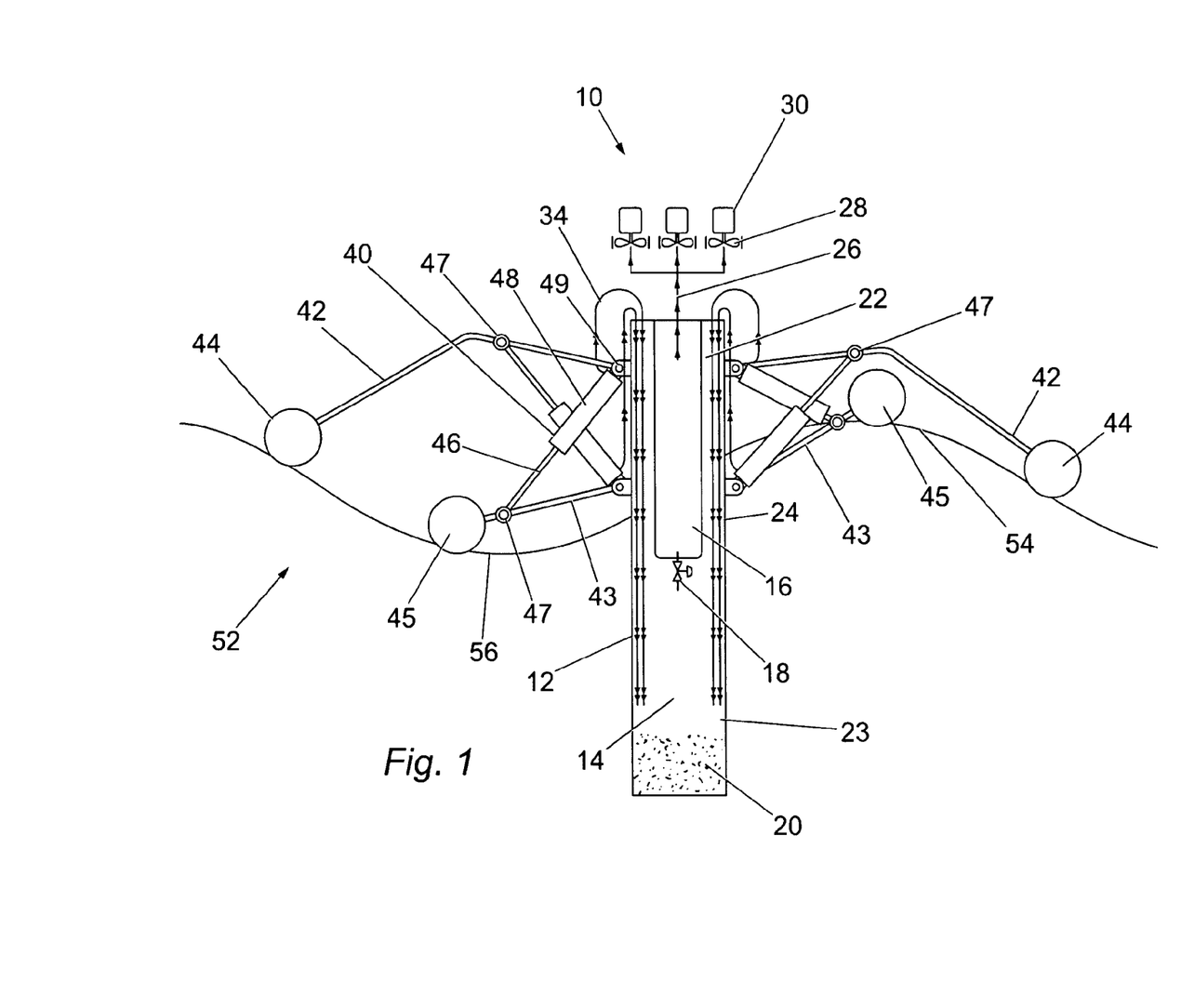
FIG. 1 is a sectional view of apparatus according to one embodiment of the present invention.

FIG. 1 shows wave energy generation apparatus indicated generally at 10. The apparatus 10 comprises four floats 44, 45, although the skilled person will appreciate that more than or less than four floats could be used. The floats are cylindrical in shape and are manufactured from a material less dense than water and more dense than air to ensure that they sit on the surface 54 of the sea 52. Two inner floats 45 are attached to the outer ends of respective lower lever arms 43 and two outer floats 44 are attached to the outer ends of respective upper lever arms 42. The other (inner) end of each lever arm 42, 43 is pivotally attached to a body in the form of a spar buoy 12. Thus, two substantially opposing sides of the spar buoy 12 are each provided with two floats 44, 45.

The spar buoy 12 has a central body 24 having an upper end 22 and a lower end 23. The spar buoy 12 has a height greater than its lateral extent. Ballast 20 is shown at the lower end 23 contained within the spar buoy 12, although according to another embodiment, the ballast 20 can be attached to the exterior of the buoy 12. The function of the ballast 20 is to maintain the central body 24 in an upright position with a longitudinal axis of the body 24 substantially perpendicular to the seabed (not shown). The ballast 20 also ensures that the lower end 23 of the spar buoy is submerged beneath the surface 54 of the sea 52, while the upper end 22 protrudes therefrom.

The inner end of upper lever arms 42 is pivotally attached to the spar buoy 12 towards the upper end 22 of the spar buoy 12. The inner end of the lower lever arms 43 is pivotally attached at a lower point on the spar buoy 12. The upper lever arms 42 are longer than the lower lever arms 43 and are provided with a downwardly facing bend therein.

Also attached to each lever arm 42, 43 and a point on the spar buoy 12 is an air compressor 40. The air compressor 40 comprises a rod 46, a piston (not shown) and an air chamber 48. The piston is located at one end of the rod 46 and is movable axially within the air chamber 48. Leakage of air from the air chamber 48 is prevented by O-ring seals to provide a seal between the outer diameter of the piston and the interior of the air chamber 48. A distal end 47 of each rod 46 is fixed to the corresponding lever arm 42, 43 and one end 49 of each air chamber 48 is attached to the spar buoy 12. Thus lever arms 42, 43, air compressors 40 and a portion of the spar buoy 12 occupy a triangular configuration.

The interior of the spar buoy 12 contains a primary chamber 14, valve means in the form of a pressure control valve 18 and a secondary chamber 16. Air supply lines 34 enable fluid communication between the inner end 49 of air chambers 48 and the primary chamber 14. The air supply lines 34 are provided with one way check valves (not shown) to permit flow of air from the air chambers 48 to the primary chamber 14 but prevent flow in the reverse direction and thus prevent backflow of pressurised air. The secondary chamber 16 is located substantially centrally towards the upper end 22 within the spar buoy 12. The pressure control valve 18 can be selectively opened to enable fluid communication in the direction from the primary chamber 14 to the secondary chamber 16. A check valve may be incorporated to prevent flow in the reverse direction. A turbine feed 26 allows pressurised air out of the secondary chamber 16 to drive air turbines 28, which charge electrical generators 30.

Figure 2:
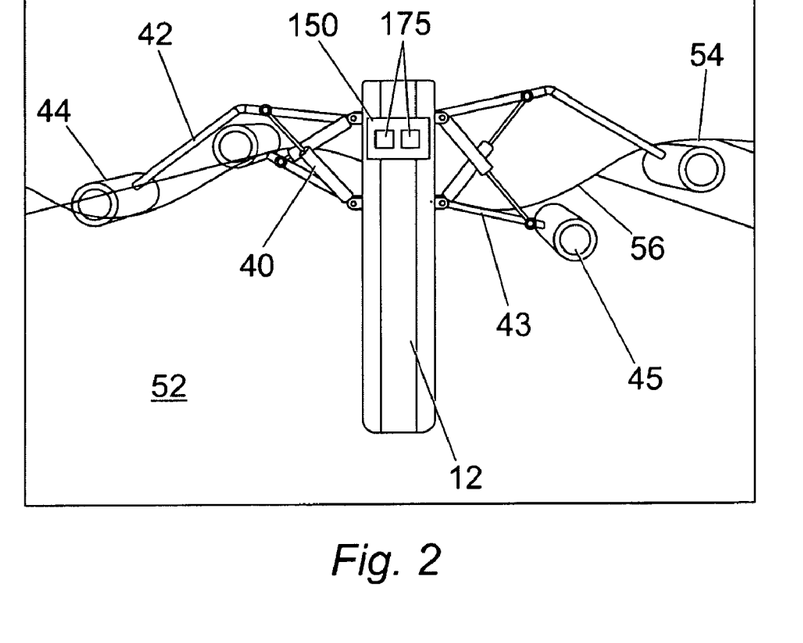
FIG. 2 is a front view of apparatus of FIG. 1.
Figure 3:
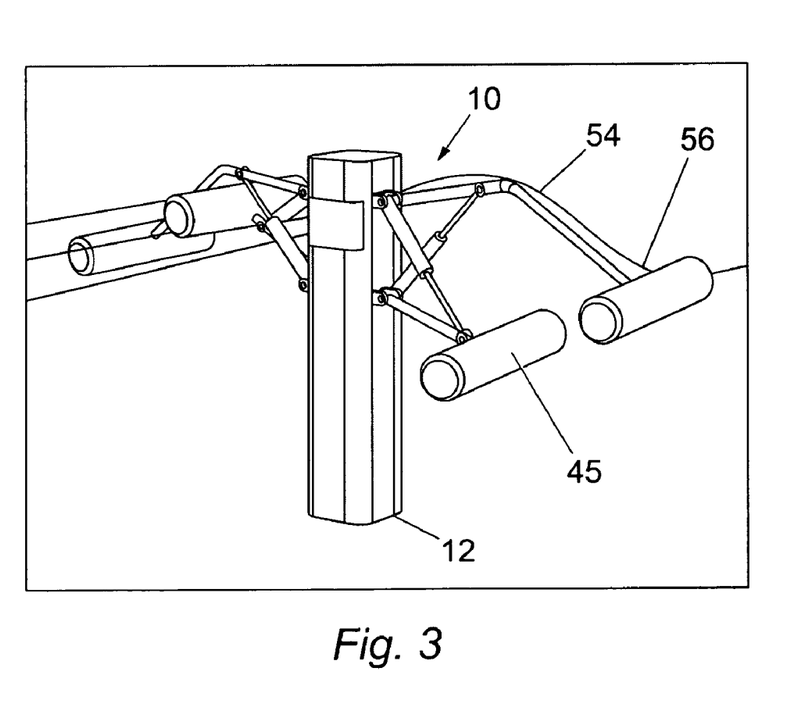
FIG. 3 is a perspective view of the apparatus of FIG. 2.

In use, the apparatus 10 is placed in the sea 52 and the lower end 23 is anchored or moored to the seabed at the desired location. The ballast 20 maintains the spar buoy 12 in an upright position as shown in FIGS. 2 and 3. The waves on the surface of the sea 52 have crests 54 and troughs 56. The pivotal attachment of the lever arms 42, 43 to the spar buoy 12 enables movement of the floats 44, 45 according to the height of the waves.

When either of the floats 44 attached to upper lever arms 42 are on the crest 54 of a wave the rod 46 will be fully extended and the air chamber 48 filled with air. Between that crest 54 and the adjacent trough 56 the height of the float 44 will drop resulting in a lowering of lever arm 42 which pushes the rod 46 and attached piston into the air chamber 48. This action compresses air within the air chamber 48 which is transmitted via the respective air supply line 34 into the primary chamber 14 within the spar buoy 12. Air intake valves (not shown) provided at the inner end 49 of the air chamber 48 allow air to be drawn into the chamber 48 as the float rises towards the next wave crest 54 and the rod 46 is pulled out of the air chamber 48.

Similarly, inner floats 45 attached to lower lever arm 43 cause compression of air within the respective air chamber 48. However, the rod 46 is fully extended when the float 45 lies in a wave trough 56. As the height of the wave increases towards the wave crest 54 the height of float 45 likewise increases thereby increasing the height of lever arm 43, which causes the rod 46 and piston to move into the air chamber 48.

The entire process is repeated as the floats 44, 45 oscillate between wave crests 54 and wave troughs 56 and thus the apparatus can be regarded as comprising multiple wave sampling points to provide a more constant supply of pressurised air to the primary chamber 14.

Compressed air from the air compressors 40 is fed by the air supply lines 34 into the primary chamber 14 of the spar buoy 12 to increase the pressure therein. Thus the primary chamber 14 acts as an accumulator. Pressure sensors (not shown) are provided within the primary chamber 14 and secondary chamber 16 to monitor the respective pressures therein. Depending on the pressure within each chamber 14, 16, the pressure control valve 18 selectively allows air to flow from the primary chamber 14 to the secondary chamber 16. The pressure sensing means and pressure control valve 18 allow the interior of the secondary chamber 16 to be accurately pressure controlled.

The pressure in the primary chamber 14 will fluctuate according to the input of pressurised fluid from the air compressors 40 delivered by air supply lines 34. The pressure of the primary chamber 14 is maintained at a higher level than that of the secondary chamber 16. The primary chamber 14 is provided with a bilge (not shown) such that moisture contained in the air will gather in the primary chamber 14 and collect in the bilge as water and this feature has the advantage that only relatively dry air will proceed to the secondary chamber 16. The moisture/water is then removed by a bilge pump (not shown).

The turbine feed 26 is used to supply pressurised air to the turbines 28. The turbines 28 have blades, which are rotated by the pressurised airflow from the turbine feed 26. The generator 30 converts the kinetic energy from the rotating turbine blades 28 into electrical energy, which can then be stored or transported onshore.

Maintaining the primary chamber 14 at a generally higher pressure than the secondary chamber 16 enables the secondary chamber 16 to be kept at a constant pressure. Furthermore, the primary chamber 14 will allow the pulses of pressurised air arriving from the respective air compressors 40 to dissipate before they reach the secondary chamber 16. This provides a smooth consistent supply of pressurised air to drive the turbines 28, so that the electric energy generated does not fluctuate.

A secondary chamber 16 may be provided for each unit having turbines 28 and a generator 30. Therefore a series of secondary chambers 16 with separate turbine feeds 26 can drive each generator unit 30.

The terms "pressurised fluid" and "high pressure" as used herein are intended to refer to a pressure higher relative to atmospheric pressure.

Figure 4:
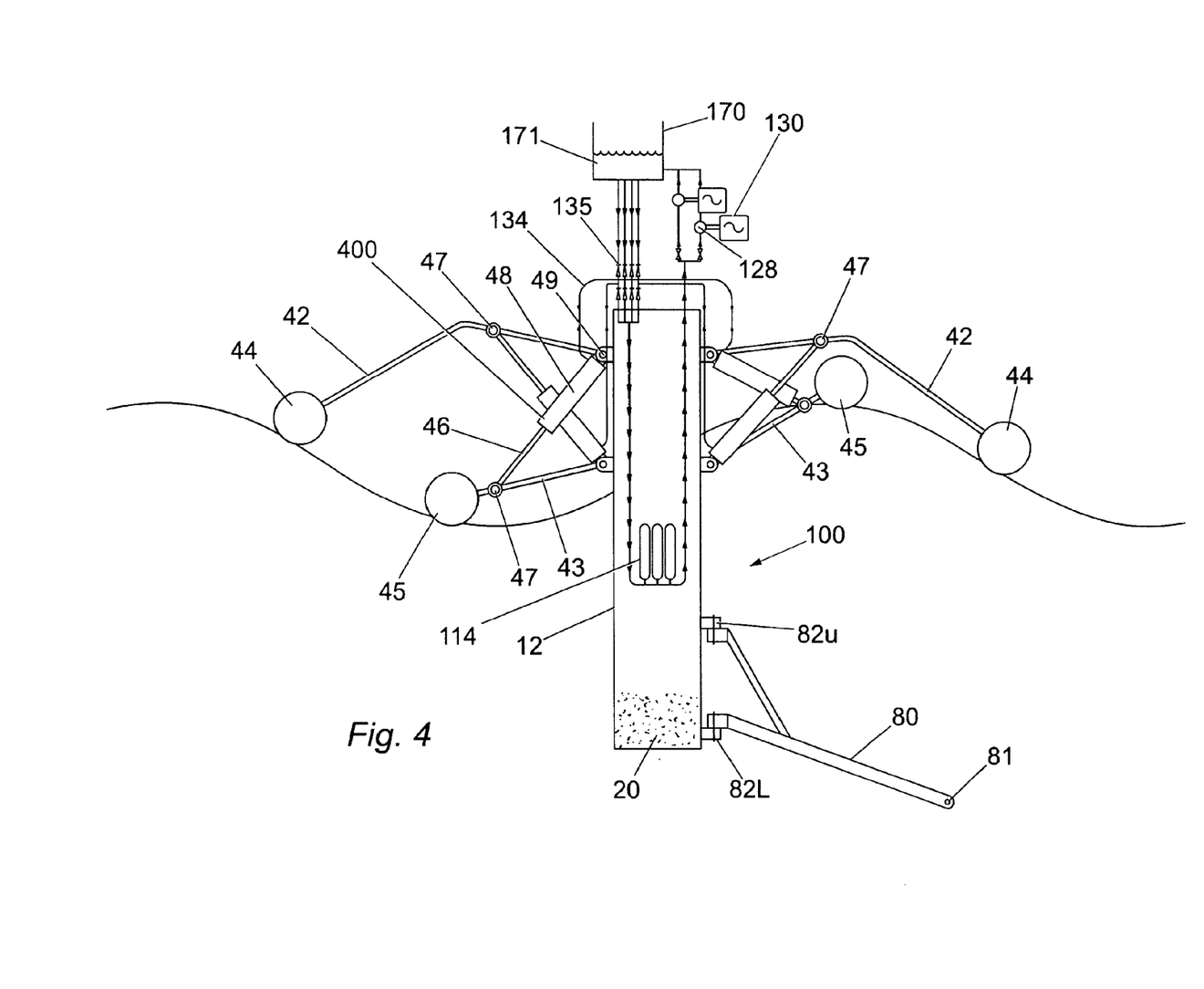
FIG. 4 is a sectional schematic view of apparatus according to a preferred embodiment of the invention.

According to another preferred embodiment shown in FIG. 4, an alternative apparatus is shown generally at 100, with like components of the first described embodiment shown with identical reference numerals.

The floats 44, 45 are attached to the spar buoy 12 and the spar buoy 12 is arranged in a similar manner as for the previous embodiment. However, the air cylinders 40 have been replaced with cylinders 400 for receiving and compressing a hydraulic fluid as the floats 44, 45 move between wave crests 54 and troughs 56. A hydraulic fluid reservoir 171 is provided within the spar buoy 12 for supplying hydraulic fluid to the cylinders 400 via hydraulic fluid supply lines 134. The lines 134 have check valves 135 fitted thereto to permit flow of the hydraulic fluid in one direction only.

The apparatus 100 functions in a similar manner as the apparatus 10 described previously. Movement of the floats 44, 45 compresses hydraulic fluid within the cylinders 400. The pressurised fluid is delivered from the lines 134 to a series of chambers in the form of accumulators 114. Although three accumulators 114 are shown in series in FIG. 4, a bank of accumulators 114 can be provided. The accumulators 114 are steel containers having an expandable rubber bladder within (not shown) and containing a pressurised gas, typically nitrogen. The bladders receive the hydraulic fluid from the cylinders 400 and expand and contract in response to the pulsed energy input against the pressure of the gas within the container. This arrangement ensures that the hydraulic fluid pressure within each bladder is substantially constant so that a uniform supply of hydraulic fluid can be delivered to hydraulic motors 128 on demand. The hydraulic motors 128 in turn are arranged to drive the generators 130. Although the schematic of FIG. 4 shows the motors 128, generators 130 and the fluid reservoir 171 out with the buoy 12, these components are housed within the central buoy.

The apparatus 100 is also provided with an anchor arm 80 having an eyelet 81 for attaching an anchor (not shown) thereto. In this way the spar buoy 12 is anchored to the seabed. The shape of the buoy is selected such that it is relatively stable in the vertical direction and this has the advantage of allowing any substantially vertical displacement of the floats 44, 45 to react against the buoy 12 and cause corresponding movement of the cylinders 400. The anchor arm 80 is pivotally attached to the spar buoy 12 by upper 82$u$ and lower 82$l$ pivotal attachments. The pivotal attachments 82$u$, 82$l$ enable the spar buoy 12 to pivot around the anchor arm 80 and enable the apparatus 100 to be correctly oriented relative the wavefront.

The process of generating energy from waves of the present invention allows a pulsed energy input to be converted to a smooth constant supply to the generators 30, 130 whilst maintaining a high level of efficiency.

Preferably the spar buoy 12 is shaped such that it is stable and not significantly moved by the motion of the waves. According to the embodiments in FIGS. 5 and 6 two spar buoys are shown generally at 212 and 312 respectively, without the lever arms 42, 43 attached.

Figure 5:
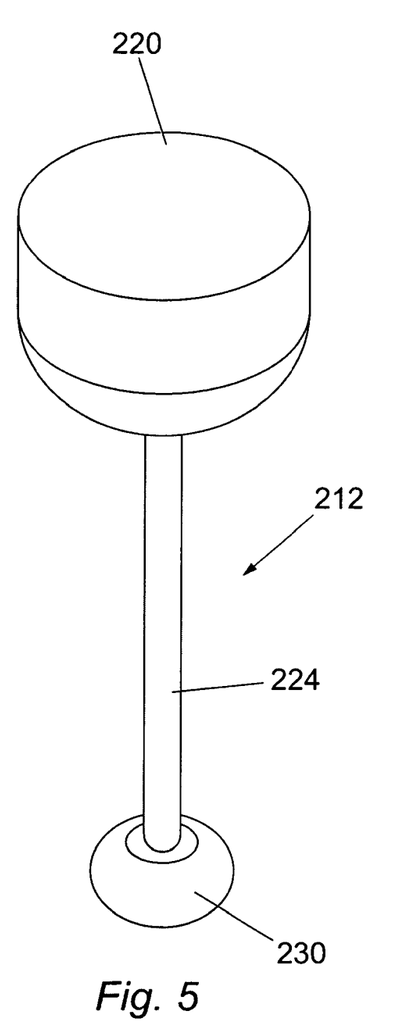
FIGS. 5 and 6 are perspective views of spar buoys according to alternative embodiments of the invention.

The spar buoy 212 has an inverse dome-shaped upper end 220 and a central shaft 224 extending therefrom to a bulbous lower end 230. Ballast (not shown) can be provided within the bulbous lower end 230 such that the mass is concentrated at the end of the long shaft 224 to substantially lower the centre of gravity of the spar buoy 212. The centre of gravity of the spar buoy 212 is much closer in use to the submerged lower end 230 than it is to the inverse dome-shaped upper end 220, the latter of which is again intended, in use, to project from the sea surface. This has the advantage of making the spar buoy 212 much more stable in water, in that it is less likely to heave or deviate from the vertical upstanding direction. The upper bulbous end 220 can contain the components internally such as the conversion means to protect them from the waves.

Figure 6:
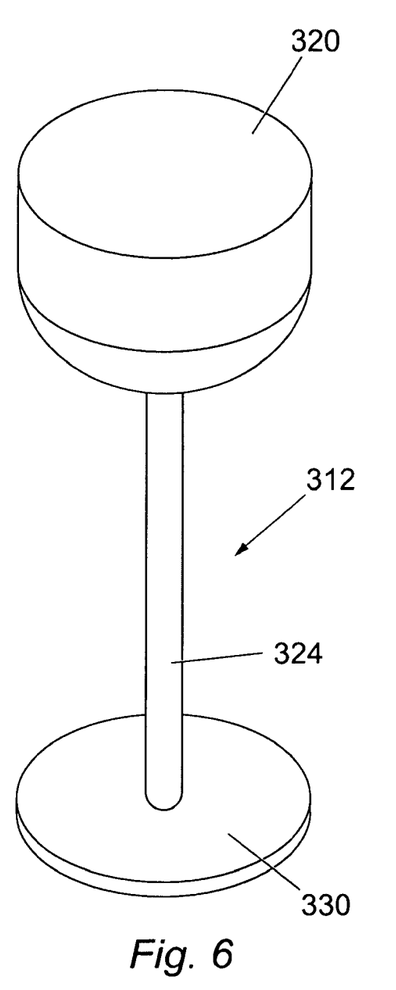

Similarly, the spar buoy 312 has an inverse dome-shaped upper end 320 and a long shaft 324 extending therefrom. However the lower end of the shaft 324 is attached to a disc-shaped end member 330 and is designed to further restrict the ability of the spar buoy 312 to heave since water acting upon the large planar surface area of the upper and lower faces of the disc shaped end member 330 will further slow movement of the spar buoy 312.

A control system 150 determines the wave amplitude by measuring the height of wave troughs 56 and wave crests 54 with sensors 175. If the control system 150 detects a small wave amplitude and low wave frequency, only one generator 30, 130 is used. As the wave amplitude and/or frequency increases, second and third generators 30, 130 may be utilised depending on the pressure within the secondary chamber 16 or the bladder, which in turn is determined by the rate at which pressurised fluid is supplied from the compressors 40, 400. Additionally, the control system determines the number of operational hours for each generator 30, 300 and turbine 28/fluid motor 128 unit and cycles their use appropriately such that each generator 30, 300 sees a substantially even number of running hours.

Below a pre-determined wave amplitude and/or frequency in very calm conditions, when it is deemed that the energy input is insufficient to run a single generator 30, 300 the control system will shut all generators 30, 300 until the minimum wave amplitude is reached which enables consistent generator 30, 300 operation. Below the minimum wave height the control system can close the valve means 18, turbine 28, motor 128 and generator 30, 130 with the floats 44, 45 and fluid compressors 40, 400 slowly allowing pressurised fluid to accumulate in the primary chamber 14 or bladder. Throughout this period of time when the generators 30, 300 are not operational, pressure is allowed to build in the primary chamber 14 or bladder.

Figure 7:
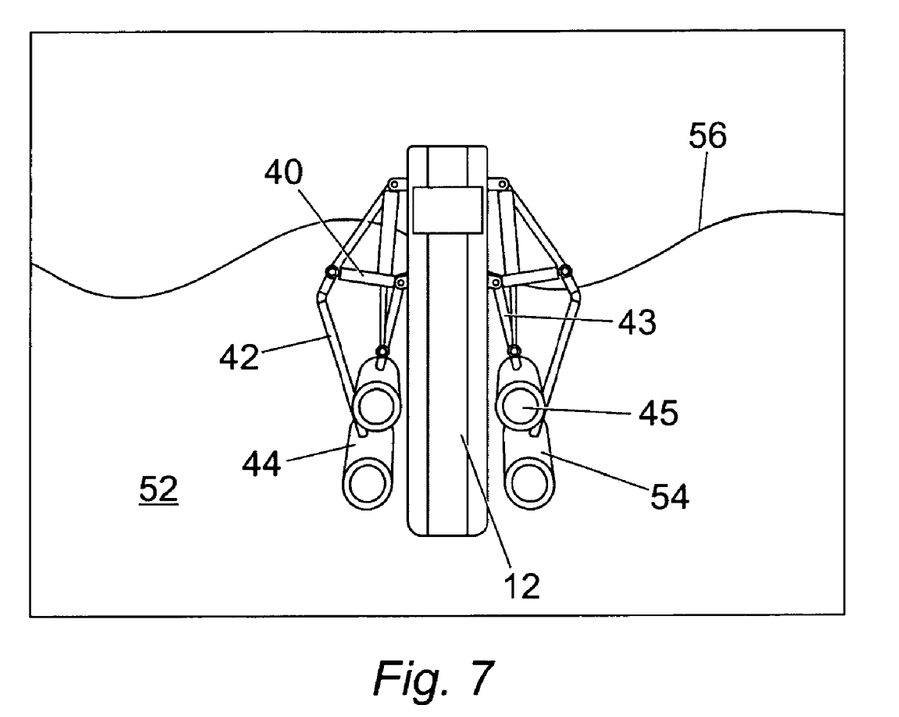
FIG. 7 illustrates the storm survival mode and the safe position of the invention.

Optionally, in the event of a storm the control system can flood the floats 44, 45 with water so that they sink to their lower limits. The fluid compressors 40, 400 can be locked in position thereby preventing movement of the rod 46 within the chamber 48. For the first embodiment air inlets and exhausts are sealed. Thus the apparatus 10, 100 is stable and designed to withstand water breaking over it without sustaining any damage. When the monitoring system determines that the wave amplitude is once again within operational parameters the above-described sequence is reversed: air ports are opened; fluid compressors 40, 400 are released; and water is displaced from the floats 44, 45 using air from the primary chamber 14.

Alternatively, a frame (not shown) can be attached to the outer part of the central body 24, allowing the fluid compressors 40, 400 to be fixed thereto.

Another advantage associated with the apparatus 10, 100 is that all the moving parts are internal which protects them from damage and minimises intrusion of the apparatus 10, 100 on the marine environment. The spar buoy 12 is stabilised by the ballast 20 and the exterior can be configured to act as an artificial reef encouraging marine growth.

The apparatus of the present invention is suitable for use in any aquatic environment and is particularly suited for use in seas and oceans. Preferably the spar buoy 12 is shaped to reduce the effect of drag from the passing waves. The present invention is advantageous since it provides an efficient method and apparatus for energy generation from wave power and provides a high electric energy output for a relatively small apparatus 10, 100 footprint.

Modifications and/or improvements may be made to the embodiments hereinbefore described without departing from the scope of protection. For example, a rack and pinion mechanism can be employed in place of the rod 46 and piston assembly. The rack can be attached to lever arms 42, 43. In this embodiment as the lever arms 42, 43 move in response to the motion of the waves, the rack moves the pinion, which in turn drives a rotary compressor. However, since the rack and pinion mechanism is a more complicated and a less efficient arrangement, the compressors 40, 400 are preferred. Although the floats 44, 45 are described as cylindrical in the above embodiment, the skilled person would recognise that the floats can be of any shape. The spar buoys 212, 312 can be substituted for the spar buoy 12 shown in and described with reference to FIGS. 1 to 4.

The invention claimed is:

1. Apparatus for generating electric energy from the motion of the waves, comprising:
   a body having a longitudinal axis;
   at least one member coupled to the body and moveable by the motion of the waves relative to the body;
   an energy transfer mechanism coupled to the at least one member wherein the energy transfer mechanism converts the kinetic energy from movement of the at least one member to potential energy by pressurisation of a fluid;
   a chamber arranged to store the pressurised fluid; and
   a converter for converting the potential energy stored in the pressurised fluid into electric energy;
   wherein the apparatus is adapted to float in water and is further adapted to be anchored to the seabed;
   wherein the body is weighted with ballast provided at or towards a lower end of the body such that a substantial proportion of the body is submerged in use, and an upper end of the body is arranged to protrude from the surface of the water such that the centre of gravity of the body is closer to the lower end than an upper end of the body;
   and wherein the apparatus is further adapted such that, in use, a longitudinal axis of the body is arranged in a direction perpendicular to the seabed and the height of the body is greater than its lateral extent.

2. Apparatus according to claim 1, wherein the chamber is provided within the body.

3. Apparatus according to claim 2, wherein the chamber and the converter are housed within the body.

4. Apparatus according to claim 2, wherein the body is shaped such that the body is substantially stable in use.

5. Apparatus according to claim 1, wherein the apparatus is arranged such that any substantially vertical displacement of the at least one member causes actuation of the at least one corresponding energy transfer mechanism.

6. Apparatus according to claim 2, wherein the energy transfer mechanism is located between the member and the body.

7. Apparatus according to claim 2, wherein the at least one member is coupled to an end of an arm and wherein another end of the arm is pivotally coupled to the body.

8. Apparatus according to claim 1, wherein the energy transfer mechanism comprises a fluid compressor coupled to the at least one member such that movement of the at least one member causes compression of fluid in the fluid compressor.

9. Apparatus according to claim 8, wherein one end of the fluid compressor is coupled to the arm and another end of the fluid compressor is coupled to the body at a point vertically spaced from the pivotal coupling of the body and the arm.

10. Apparatus according to claim 8, wherein the fluid compressor comprises a rod and a piston moveable within a cylinder for containing the fluid to be pressurised.

11. Apparatus according to claim 8, wherein the fluid compressor comprises a rack and pinion mechanism and rotary compressor.

12. Apparatus according to claim 1, wherein the at least one member includes a float.

13. Apparatus according to claim 1, wherein a plurality of members are provided.

14. Apparatus according to claim 1, further comprising a directional member arranged to correctly orient the apparatus in use, relative to the wavefront.

15. Apparatus according to claim 14, wherein the directional member comprises an anchor-arm pivotally coupled to the body about an axis substantially parallel to the longitudinal axis of the body.

16. Apparatus according to claim 1, comprising a control system having sensors arranged to monitor wave amplitude and frequency.

17. Apparatus according to claim 16, wherein above a certain pre-determined maximum wave amplitude, the control system is programmed to automatically cause the apparatus to occupy a safe position in a storm survival mode.

18. Apparatus according to claim 17, wherein the body is provided with an outer frame and wherein the at least one member is arranged to be attached to the frame in the storm survival mode.

19. Apparatus according to claim 17, wherein the energy transfer mechanism is locked in a pre-determined position in the storm survival mode.

20. Apparatus according to claim 1, wherein at least two generators are provided.

21. A method for energy generation from wave power comprising the steps of:
   providing at least one member arranged to move in response to motion of the waves and coupling the at least one member to a body having a longitudinal axis such that the at least one member is moveable relative to the body;
   weighting the body with ballast provided at or towards a lower end of the body such that a substantial proportion of the body is submerged in use, and an upper end of the body is arranged to protrude from the surface of the water and such that the centre of gravity of the body is closer to the lower end than an upper end of the body and wherein a longitudinal axis of the body is arranged in a direction perpendicular to the seabed and the height of the body is greater than its lateral extent;
   anchoring the body to the seabed such that it floats in the water; and
   converting kinetic energy of the at least one member into potential energy by pressurisation of a fluid;
   storing the pressurised fluid in a chamber; and
   converting the potential energy of the pressurised fluid into electric energy.

22. The method according to claim 21, including housing the chamber in a body and shaping the body such that it is substantially stable relative to the motion of the waves.

23. The method according to claim 22, including pivotally coupling one end of an arm to the body and attaching the or each member to another end of the arm.

24. The method according to claim 23, including pivotally coupling one end of an energy transfer mechanism to the arm and another end of the energy transfer mechanism to the body, vertically spaced from the coupling with the body and the arm.

25. The method according to claim 22, including orienting the body correctly relative to each wavefront.

26. Apparatus for generating electric energy from the motion of the waves, comprising:
   at least one member moveable by the motion of the waves;
   an energy transfer mechanism coupled to the or each member wherein the energy transfer mechanism converts the kinetic energy from movement of the or each member to potential energy by pressurisation of a fluid;
   a chamber arranged to store the pressurised fluid; and
      a conversion means for converting the potential energy stored in the pressurised fluid into electric energy;
      further comprising a directional means arranged to correctly orient the apparatus in use, relative to the wavefront, the directional means comprising an anchor-arm pivotally coupled to the body about an axis substantially parallel to the longitudinal axis of the body.

27. Apparatus for generating electric energy from the motion of the waves, comprising:
   at least one member moveable by the motion of the waves;
   an energy transfer mechanism coupled to the or each member wherein the energy transfer mechanism converts the kinetic energy from movement of the or each member to potential energy by pressurisation of a fluid;
   a chamber arranged to store the pressurised fluid;
      a conversion means for converting the potential energy stored in the pressurised fluid into electric energy;
      a control system having sensors arranged to monitor wave amplitude and frequency wherein above a certain predetermined maximum wave amplitude, the control system is programmed to automatically cause the apparatus to occupy a safe position in a storm survival mode;
      wherein the body is provided with an outer frame and wherein the one or more members are arranged to be attached to the frame in the storm survival mode.

28. Apparatus for generating electric energy from the motion of the waves, comprising:
   at least one member moveable by the motion of the waves;
   an energy transfer mechanism coupled to the or each member wherein the energy transfer mechanism converts the kinetic energy from movement of the or each member to potential energy by pressurisation of a fluid;
   a chamber arranged to store the pressurised fluid;
      a conversion means for converting the potential energy stored in the pressurised fluid into electric energy;
      a control system having sensors arranged to monitor wave amplitude and frequency wherein above a certain predetermined maximum wave amplitude, the control system is programmed to automatically cause the apparatus to occupy a safe position in a storm survival mode;
      wherein the energy transfer mechanism is locked in a predetermined position in the storm survival mode.

29. A method for energy generation from wave power comprising the steps of:—
   providing at least one member arranged to move in response to motion of the waves;
   orienting the body correctly relative to each wavefront;
   converting kinetic energy of the at least one member into potential energy by pressurisation of a fluid;
   storing the pressurised fluid in a chamber housed in a body shaped such that it is substantially stable relative to the motion of the waves; and
   converting the potential energy of the pressurised fluid into electric energy.

\* \* \* \* \*